E. M. CURRY.
SPRING TIRE.
APPLICATION FILED JUNE 16, 1921.
1,390,024.  Patented Sept. 6, 1921.
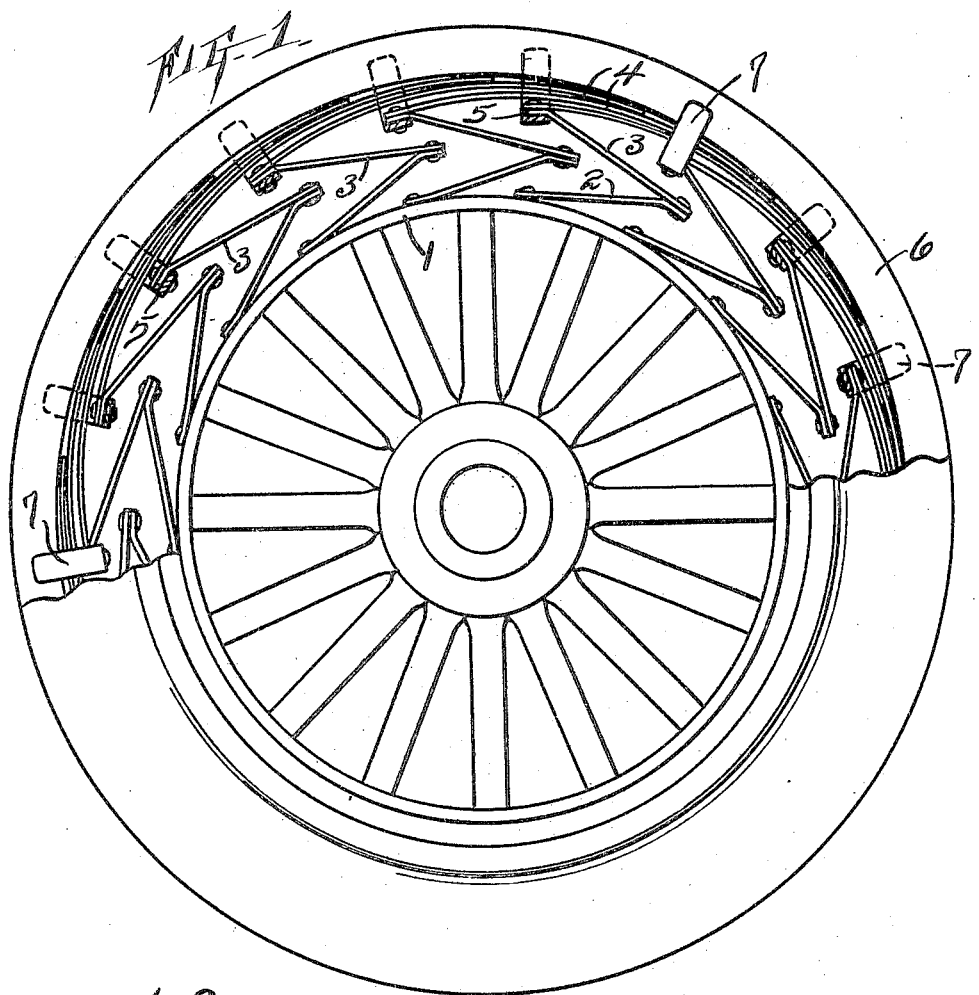
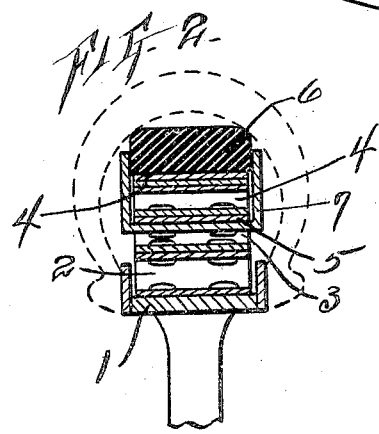
Inventor,
Evan M. Curry,
By A. L. Jackson
Attorney

UNITED STATES PATENT OFFICE.

EVAN M. CURRY, OF ALTUS, OKLAHOMA.

SPRING-TIRE.

1,390,024.

Specification of Letters Patent.  Patented Sept. 6, 1921.

Application filed June 16, 1921. Serial No. 478,013.

*To all whom it may concern:*

Be it known that I, EVAN M. CURRY, a citizen of the United States of America, residing at Altus, in the county of Jackson and State of Oklahoma, have invented certain new and useful Improvements in Spring-Tires, of which the following is a specification.

My invention relates to vehicle wheels and more particularly to tires for vehicles; and the object is to provide an efficient tire for taking the place of rubber and pneumatic tires and to provide spring tires which will have the necessary resiliency and which will not be crystalized and broken by constant service. Other objects and advantages will be fully explained in the following description and the invention will be more particularly pointed out in the claims.

Reference is had to the accompanying drawings which form a part of this application.

Figure 1 is a side elevation of a wheel with the casing of the tire partly broken away and part shown in section.

Fig. 2 is a section through the tire and wheel rim.

Similar characters of reference are used to indicate the same parts throughout the several views.

The drawings show a wheel rim 1 and springs 2 attached at one end to the wheel rim 1. The spring elements consist of a series of units. Each unit is made up of an inner spring 2, as above described, an intermediate spring 3 attached at one end to the other end of the inner spring 2, an outer spring 4 attached at one end to the other end of the intermediate spring 3; and a U-shaped brace attached to said outer and intermediate springs at their junction. The arms of the brace 7 project radially outward and engage a rubber tread 6. In this manner the rubber tread 6 and the springs 2, 3 and 4 are held in circumferential alinement. The brace 7 is attached to the springs 3 and 4 at their juncture 5 so that the braces will not affect the resiliency of the springs. The outer spring 4 should lap at least on two units so that a continuous tread will be formed, the springs 4 being capable of free movement on each other.

For some purposes the spring elements above described may be used without a casing or shoe, as for truck wheels. For pleasure and touring cars a casing may be used to inclose all the spring elements and the tread 6 in the manner shown in the drawing. Various changes in the widths and lengths of the spring and the braces may be made without departing from my invention.

What I claim, is:—

1. A tire for vehicles having a series of units, each consisting of an inner spring attached at one end to the wheel rim, an intermediate spring attached at one end to the other end of said inner spring, an outer spring attached at one end to the other end of said intermediate spring, the other end of said outer spring forming a part of the tread for the wheel, and means for holding said springs in circular alinement.

2. A tire for vehicles having a series of units, each consisting of an inner spring attached at one end to the wheel rim, an intermediate spring attached at one end to the other end of said inner spring, an outer spring attached at one end to the other end of said intermediate spring, the other end of said outer spring forming a part of the tread for the wheel, each outer spring lapping on at least two of said units, and means for holding said springs in circular alinement.

3. A tire for vehicles having a series of units, each consisting of an inner spring attached at one end to the wheel rim, an intermediate spring attached at one end to the other end of said inner spring, an outer spring attached at one end to the other end of said intermediate spring, the other end of said outer spring forming a part of the tread for the wheel, each outer spring lapping on at least two of said units, and a U-shaped brace for each unit attached to said intermediate and outer springs at the juncture and projecting radially outward to hold said units in circular alinement.

4. A tire for vehicles having a series of units, each consisting of an inner spring attached at one end to the wheel rim, an intermediate spring attached at one end to the other end of said inner spring, an outer spring attached at one end to the other end of said intermediate spring, the other end of said outer spring forming a part of the tread for the wheel, each outer spring lapping on at least two of said units, a rubber tread engaging all of said units, and means for holding said springs and tread in circular alinement.

In testimony whereof, I set my hand, this 27th of May, 1921.

EVAN M. CURRY.